United States Patent
Seo

(10) Patent No.: US 10,093,364 B2
(45) Date of Patent: Oct. 9, 2018

(54) BALANCING APPARATUS OF VEHICLE AND CONTROL METHOD THEREOF

(71) Applicant: Hyundai Motor Company, Seoul (KR)

(72) Inventor: Wook Hwan Seo, Seoul (KR)

(73) Assignee: Hyundai Motor Company, Seoul (KR)

( * ) Notice: Subject to any disclaimer, the term of this patent is extended or adjusted under 35 U.S.C. 154(b) by 354 days.

(21) Appl. No.: 14/946,370

(22) Filed: Nov. 19, 2015

(65) Prior Publication Data

US 2017/0050685 A1 Feb. 23, 2017

(30) Foreign Application Priority Data

Aug. 21, 2015 (KR) .......................... 10-2015-0117782

(51) Int. Cl.
*B62D 37/04* (2006.01)
*B60K 1/04* (2006.01)

(52) U.S. Cl.
CPC ................ *B62D 37/04* (2013.01); *B60K 1/04* (2013.01); *B60K 2001/0433* (2013.01); *B60K 2001/0494* (2013.01)

(58) Field of Classification Search
None
See application file for complete search history.

(56) References Cited

U.S. PATENT DOCUMENTS

| | | | | |
|---|---|---|---|---|
| 6,408,963 B1 * | 6/2002 | Lansberry | ............... | B62D 49/02 180/209 |
| 7,350,787 B2 * | 4/2008 | Voss | .......................... | B62J 99/00 180/218 |
| 8,201,849 B2 * | 6/2012 | Bauer | .................. | B62D 49/085 172/611 |
| 9,359,029 B2 * | 6/2016 | Knight | .................... | B60D 1/665 |
| 9,475,193 B2 * | 10/2016 | Bosscher | ............... | B25J 9/1674 |
| 9,573,591 B2 * | 2/2017 | Matoy | ................. | B60W 30/045 |
| 9,592,862 B2 * | 3/2017 | Pugh | ...................... | B62D 49/04 |
| 2002/0157886 A1 * | 10/2002 | Iwase | ....................... | B60K 1/04 180/68.5 |
| 2002/0180166 A1 * | 12/2002 | Voss | ........................ | B62J 99/00 280/5.5 |
| 2006/0032691 A1 * | 2/2006 | Strong | ............... | B60G 17/0165 180/237 |
| 2006/0108154 A1 * | 5/2006 | Mack | ..................... | B60T 8/172 177/136 |
| 2007/0095975 A1 * | 5/2007 | Walden | ..................... | B64B 1/70 244/30 |

(Continued)

FOREIGN PATENT DOCUMENTS

JP H07-246843 A 9/1995
KR 97-0003556 B1 3/1997

(Continued)

*Primary Examiner* — Peter D Nolan
(74) *Attorney, Agent, or Firm* — Mintz Levin Cohn Ferris Glovsky and Popeo, P.C.; Peter F. Corless

(57) ABSTRACT

A balancing apparatus of a vehicle includes: a load sensor installed in a seat of the vehicle to measure a weight of a passenger sitting on the seat; and a balance control apparatus that controls a center of gravity of the vehicle, when the balance control apparatus includes: a battery pack that supplies power to the vehicle, and the battery pack is movably installed on a frame module and moves to control the center of gravity of the vehicle based on a value measured by the load sensor.

10 Claims, 8 Drawing Sheets

(56) References Cited

U.S. PATENT DOCUMENTS

| | | | | |
|---|---|---|---|---|
| 2010/0117346 A1* | 5/2010 | Bauer | ............... | B62D 49/0628 |
| | | | | 280/758 |
| 2011/0118944 A1* | 5/2011 | Tzipman | ............. | B60G 99/002 |
| | | | | 701/48 |
| 2012/0035786 A1* | 2/2012 | Yamauchi | .............. | B62D 37/04 |
| | | | | 701/2 |
| 2015/0115570 A1* | 4/2015 | Knight | .................. | B60D 1/665 |
| | | | | 280/405.1 |
| 2016/0052567 A1* | 2/2016 | Pugh | ..................... | B62D 49/04 |
| | | | | 280/638 |
| 2016/0229057 A1* | 8/2016 | Bosscher | ............... | B25J 9/1674 |
| 2016/0272198 A1* | 9/2016 | Matoy | ................ | B60W 30/045 |
| 2016/0280307 A1* | 9/2016 | Takenaka | ............... | B62K 21/00 |

FOREIGN PATENT DOCUMENTS

| | | | |
|---|---|---|---|
| KR | 20-1998-0022805 U | | 7/1998 |
| KR | 10-1998-034938 A | | 8/1998 |
| KR | 1998-057165 A | | 9/1998 |
| KR | 1999-002960 | | 1/1999 |
| KR | 10-0198033 B1 | | 6/1999 |
| KR | 10-1999-0047673 A | | 7/1999 |
| KR | 10-0314457 B1 | | 10/2001 |
| KR | 100314457 B1 | * | 10/2001 |
| KR | 2003-0017778 A | | 3/2003 |
| KR | 2003-0088899 A | | 11/2003 |
| KR | 2006-0059373 A | | 6/2006 |
| KR | 10-1410631 B1 | | 6/2014 |
| KR | 101410631 B1 | * | 6/2014 |
| KR | 10-2014-0095340 A | | 8/2014 |

\* cited by examiner

BALANCING APPARATUS OF VEHICLE AND CONTROL METHOD THEREOF

CROSS-REFERENCE TO RELATED APPLICATION

This application is claims under 35 U.S.C. § 119(a) the benefit of Korean Patent Application No. 10-2015-0117782, filed on Aug. 21, 2015 in the Korean Intellectual Property Office, the entire contents of which are incorporated by reference herein.

BACKGROUND (a) Technical Field

The present invention relates to a balancing apparatus of a vehicle and a control method thereof, and more particularly, to a balancing apparatus and a control method capable of constantly adjusting a center of gravity depending on a load of a vehicle.

(b) Description of the Related Art

Recently, a rechargeable lithium seconclaty battery has been widely used as an energy source for a wireless mobile device. Further, an electric vehicle (EV), a hybrid electric vehicle (HEV), etc., have received much attention as a possible solution for the air pollution problem of existing gasoline vehicles, diesel vehicles, etc., that run on fossil fuels. The electric vehicle and the hybrid electric vehicle are driven by a power supply voltage supplied from a high voltage battery.

In particular, the hybrid electric vehicle (hereinafter, referred to as "vehicle") can be controlled to optimize fuel efficiency of a gasoline engine in response to driving conditions. The vehicle receives inertial energy through a wheel upon braking and deceleration to charge a battery by recovering electric energy generated by a motor, thereby improving fuel efficiency.

Generally, dynamic performance of the vehicle is determined depending on a weight distribution of a vehicle body. Power performance of the vehicle may be increased only when the tires come in contact with the ground. For this reason, the power performance and the driving stability may be guaranteed only when the weight of the vehicle is appropriately distributed to the tires. That is, four wheels may stably contact the ground only when weight is equally distributed to the front, back, left, and right sides of the vehicle.

Meanwhile, the left and right sides and the front and back sides of the vehicle have different weight distribution ratios depending on a weight of passengers, and therefore the weight distribution to the left and right sides may not be appropriately compensated. Further, the weight distribution may be changed depending on a position of the engine in an engine room.

That is, the weight distribution may be changed depending on the weight and position of passengers and the position of the engine in the engine room. Further, in all vehicle models, left and right axle weights may be different and trims for each engine may be different, and even in the case of the same vehicle model, the left and right axle weights may be different, such that driving performance may be degraded.

SUMMARY

An aspect of the present invention provides a balancing apparatus of a vehicle and a control method thereof capable of improving driving stability and convenience by constantly maintaining a left and right balance while the vehicle is driven.

However, technical problems of the present invention are not limited to the above-mentioned matters and other technical problems which are not mentioned can be clearly understood to those skilled in the art from the following descriptions.

According to an exemplary embodiment of the present invention, a balancing apparatus of a vehicle includes: a load sensor configured to be installed in a seat of the vehicle to measure a weight of a passenger sitting on the seat; and a balance control apparatus configured to control a center of gravity of the vehicle.

The balance control apparatus may include: a battery pack configured to supply power to the vehicle and the battery pack may be movably installed on a frame module and may move to control the center of gravity of the vehicle based on a value measured by the load sensor.

The frame module may include a moving frame configured to be fixed in the vehicle and a fixed frame configured to be fixed with the battery pack and movably installed on the moving frame.

The frame module may include a driver configured to move the moving frame from the fixed frame.

The driver may include a motor configured to generate a torque; and a bracket configured to be provided with the motor, and the bracket may be installed to move the fixed frame from the moving frame by an operation of the motor.

The motor may be directly connected to the moving frame to deliver the torque generated from a rotor to the moving frame.

The fixed frame may be provided in plural and the driver may be installed between the fixed frames.

The motor may have both sides provided with rotating shafts to move the plurality of fixed frames in the same direction and a first rotating shaft and a second rotating shaft may be each connected to the fixed frames.

The bracket may be provided with a seating part in which the motor is disposed and may be provided with a fixed protrusion through which the rotating shaft penetrates.

The fixed protrusion may be formed in plural at different sizes.

The balance control apparatus may be installed on a rear floor of the vehicle to control left and right centers of gravity of the vehicle.

Specific matters of other exemplary embodiments will be included in a detailed description and the accompanying drawings.

BRIEF DESCRIPTION OF THE DRAWINGS

The above and other objects, features and advantages of the present invention will be more apparent from the following detailed description taken in conjunction with the accompanying drawings.

DETAILED DESCRIPTION

Figure 1:
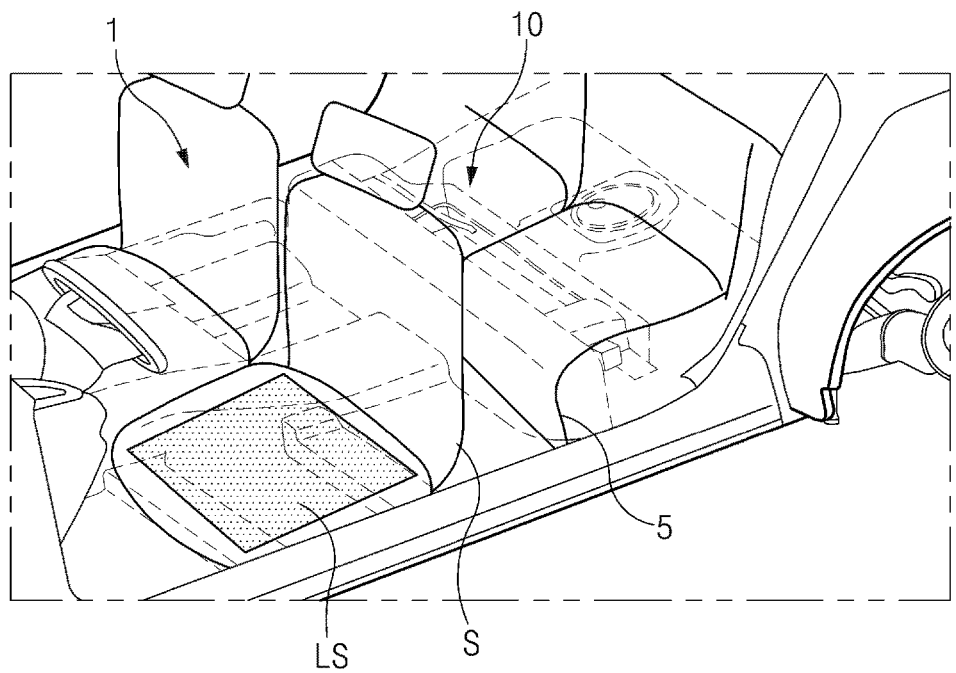
FIG. 1 is a perspective view illustrating a balancing apparatus of a vehicle according to an embodiment of the present invention.

It is understood that the tem "vehicle" or "vehicular" or other similar tem as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the invention of the present invention will be complete, and will fully convey the scope of the invention to those skilled in the art and therefore the present invention will be defined within the scope of claims. Like reference numerals throughout the specification denote like elements.

Hereinafter, a balancing apparatus of a vehicle and a control method thereof according to exemplary embodiments of the present invention will be described with reference to the accompanying drawings.

Figure 2:
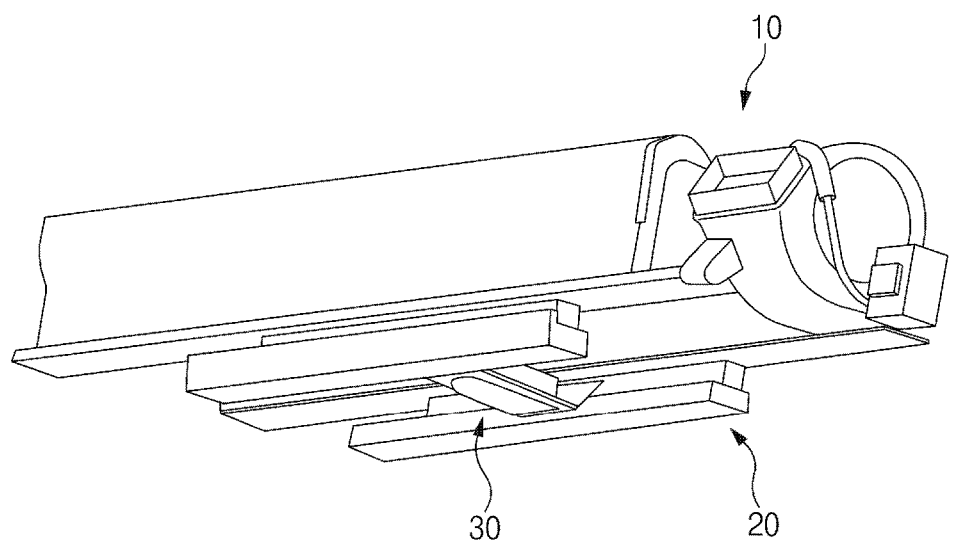
FIG. 2 is a perspective view of a balance control apparatus according to an embodiment of the present invention.
Figure 3A:
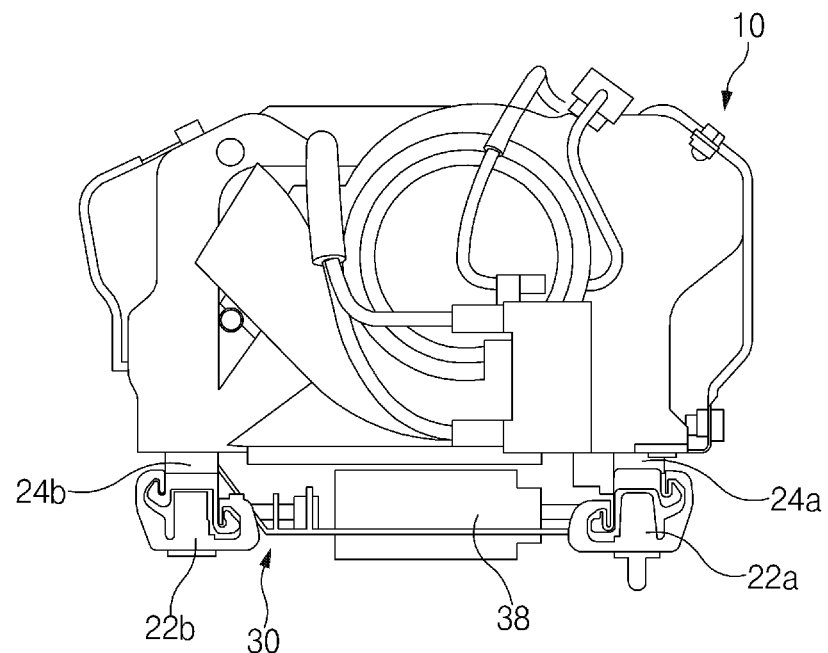
FIGS. 3A and 3B are left and right side views of the balance control apparatus according to the embodiment of the present invention.
Figure 3B:
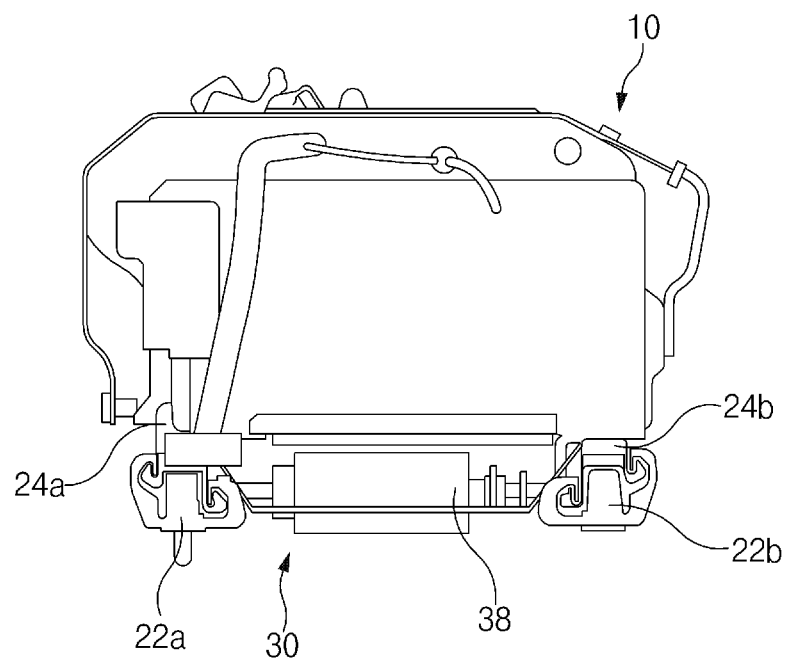
Figure 4:
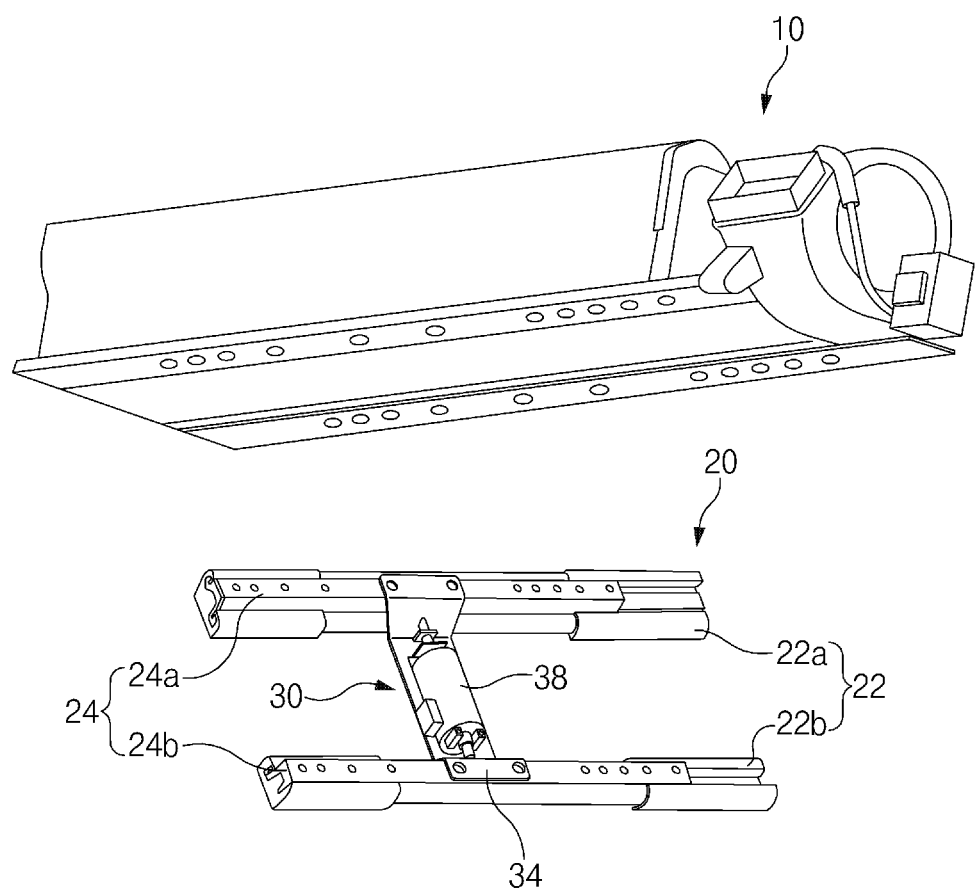
FIG. 4 is an exploded perspective view of the balance control apparatus according to the present invention.
Figure 5A:
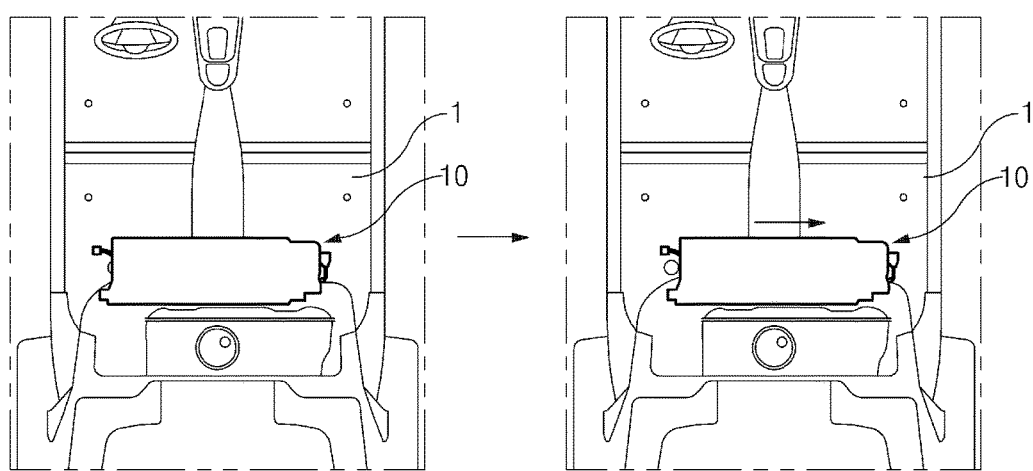
FIGS. 5A and 5B are plan views of the balance control apparatus during operation.
Figure 5B:
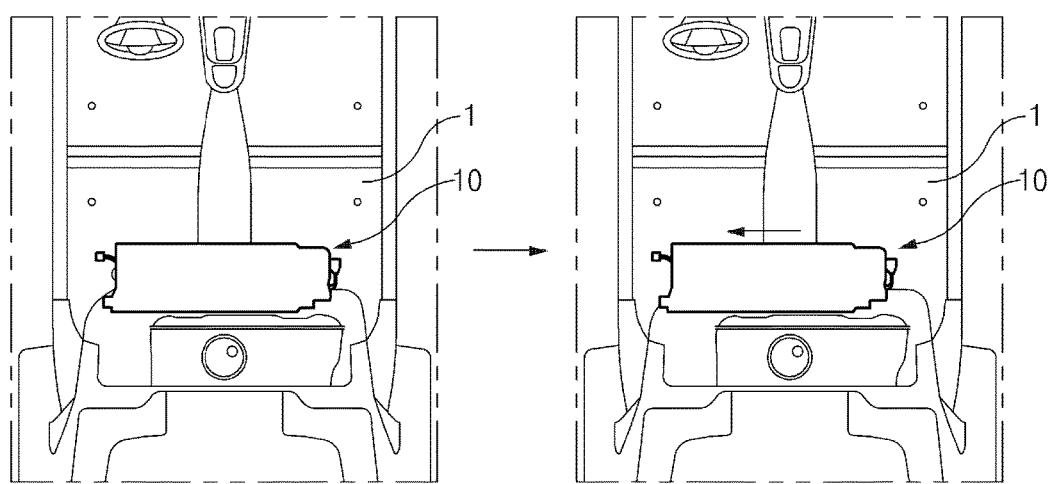
Figure 6:
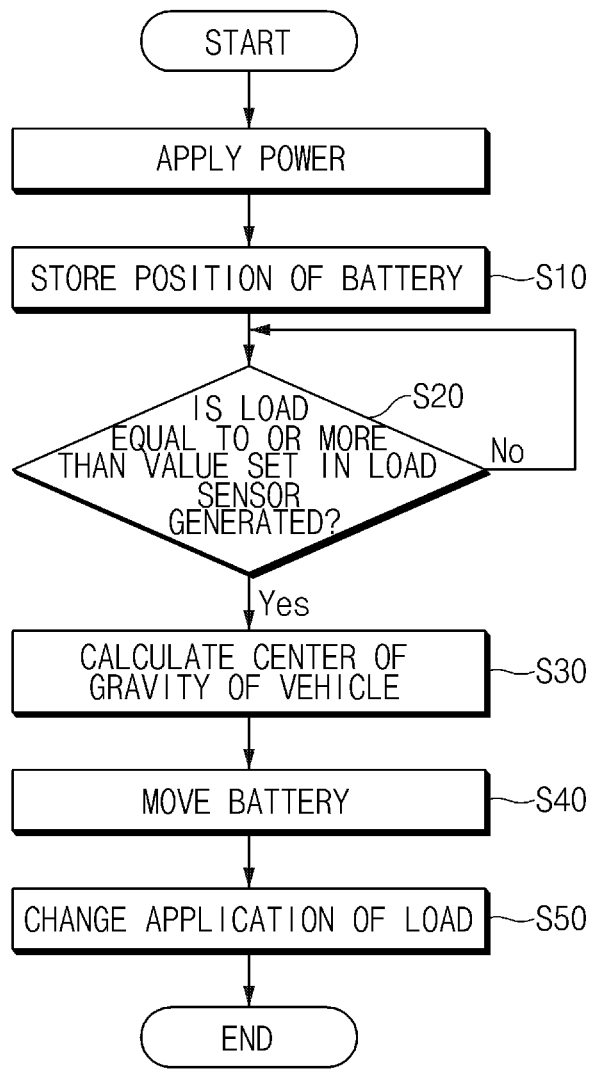
FIG. 6 is a flow chart of an embodiment of a control method of the balancing apparatus according to the present invention.
Figure 7:
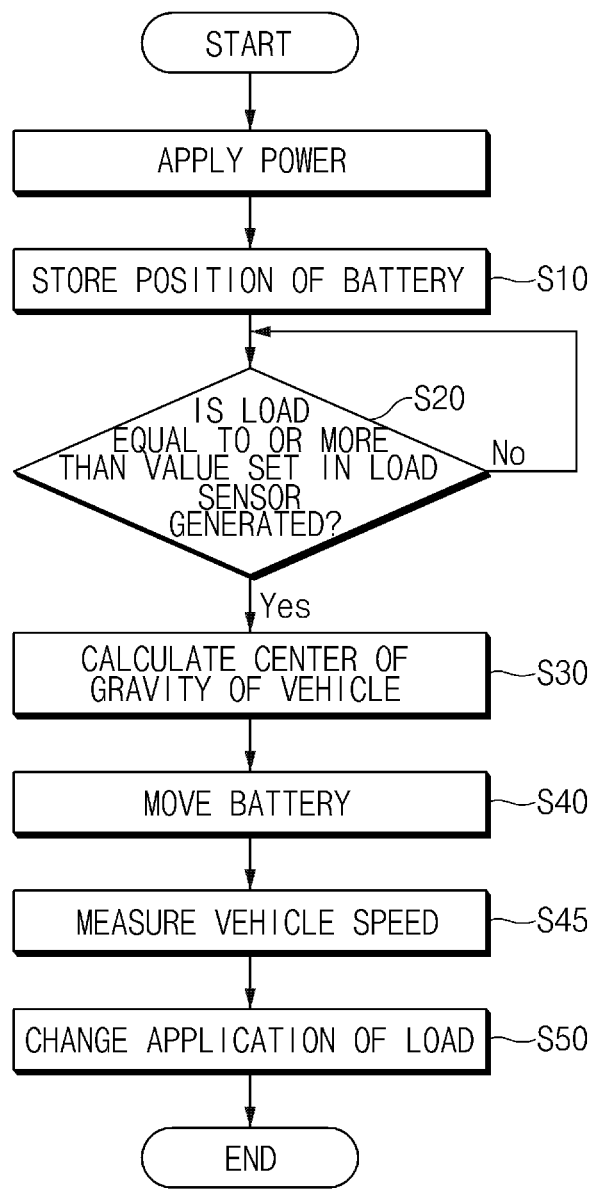
FIG. 7 is a flow chart of another embodiment of a control method of the balancing apparatus according to the present invention.

FIG. 1 is a perspective view illustrating a balancing apparatus of a vehicle according to an embodiment of the present invention. FIG. 2 is a perspective view of a balance control apparatus according to the present invention, FIGS. 3A and 3B are left and right side views of the balance control apparatus according to the present invention, FIG. 4 is an exploded perspective view of the balance control apparatus according to the present invention, FIGS. 5A and 5B are plan views of the balance control apparatus during operation, FIG. 6 is a flow chart of an embodiment of a control method of the balancing apparatus according to the present invention, and FIG. 7 is a flow chart of another embodiment of a control method of the balancing apparatus according to the present invention.

A preferred balancing apparatus of a vehicle and a control method thereof may be changed by a person having ordinary skill in the art and the present embodiment corresponds to the balancing apparatus of a vehicle and the control method thereof.

FIG. 1 is a perspective view illustrating a balancing apparatus of a vehicle according to an embodiment of the present invention. FIG. 2 is a perspective view illustrating a balancing control apparatus according to the present invention.

Describing the balancing apparatus of a vehicle according to the present invention with reference to FIGS. 1 and 2, the balancing apparatus of a vehicle includes a load sensor LS installed in a seat S of a vehicle 1 to measure a weight of a passenger sitting on a seat, and balance control apparatuses 10 and 20 installed to control a center of gravity of the vehicle 1.

The balance control apparatuses 10 and 20 include a battery pack 10 supplying power to the vehicle 1 and a frame module 20 on which the battery pack 10 is installed. In particular, the battery pack 10 and the frame module 20 are referred to individually or collectively as a "balance control apparatus" or "balance controlled apparatuses," respectively. The battery pack 10 is movably installed on the frame module 20. The battery pack 10 moves to control the center of gravity of the vehicle based on a value measured by the load sensor.

According to one embodiment, the balance control apparatuses 10 and 20 may be installed on a rear floor 5 of the vehicle to control centers of gravity of the left and right sides of the vehicle. The rear floor 5 forms a bottom surface of a rear side of the vehicle 1. The balance control apparatuses 10 and 20 can be disposed lengthwise so as to extend between the left and right sides of the vehicle. The balance control apparatuses 10 and 20 preferably are bolted to the rear floor 5 by a four point type and fixed. The balance control apparatuses 10 and 20 can be installed at a reinforced position of the rear floor 5 to prevent a watertight problem from occurring.

The load sensor is installed in the seat of the vehicle to sense a weight of a passenger. The load sensor transfers the measured value to a controller (not illustrated). The controller compares the value measured by the load sensor with the preset value and then if it is determined that the measured value is equal to or more than the preset value, moves the battery pack 10. As the load sensor, the already disclosed sensors may be used. In one embodiment of the present invention, a seat into which a load measurement tube is inserted will be described.

Here, the value preset in the controller may be based on a weight of the vehicle body, vehicle specifications, values obtained by calculating axle weights, etc., of the vehicle depending on weights for each part, or the like. Further, the controller may calculate axle weights for each seater condition depending on the load application amount by calculating weights and centers of gravity for each system. That is, the controller stores a first position of the battery pack when power is applied and calculates a balance value for each condition as described above depending on the load application amount to calculate a moving amount of the battery pack 10 to move the battery pack 10 to an optimal position so as to balance the left and right sides.

FIGS. 3A and 3B are left and right side views of the balance control apparatus according to the present invention, and FIG. 4 is an exploded perspective view of the balance control apparatus according to the present invention.

Describing in more detail the balance control apparatus with reference to FIGS. 3 and 4, a frame module 20 includes a moving frame 24 fixed with the battery pack 10, a fixed frame 22 fixed to the vehicle 1, and a driver 30 moving the fixed frame 22.

The frame module 20 has an upper portion provided with the battery pack 10 and a lower portion fixedly installed in the vehicle. In the frame module 20, the battery pack 10 is installed on the moving frame 24 and the moving frame 24 is movably installed on the fixed frame 22 by the operation of the driver 30. The moving frame 24 moves along a rail formed in a length direction of the fixed frame 22. In the frame module 20, the driver moving the moving frame 24 may be provided between the moving frame 24 and the fixed frame 22.

The fixed frame 22 may be provided in a rectangular shape or a bar shape. The fixed frame 22 is provided with the rail. The rail is formed to match the shape of the fixed frame 22, such that the moving frame 24 moves along the rail.

The moving frame 24 is provided to be shorter than a length of the fixed frame 22 to be movably coupled with the fixed frame 22. The moving frame 24 is provided with the driver 30 but a torque of the driver 30 is transferred to the fixed frame 22. The moving frame 24 moves in the length direction of the fixed frame 22 by the operation of the driver 30. The driver 30 is provided between the moving frame 24 and the battery pack 10.

According to one embodiment, the fixed frame 22 and the moving frame 24 are provided in plural. Further, a fixed bracket 34 connected to the fixed frame 22 while being coupled with the moving frame 24 is provided. One surface of the fixed frame 22 connected to the fixed bracket 34 is provided with the rail and thus the fixed bracket 34 may move. The driver 30 may be further provided between the plurality of fixed frames 22. The fixed frame 22 includes a plurality of fixed frames 22a, 22b, and the moving frame 24 includes a plurality of moving frames 24a, 24b.

The driver 30 includes a motor 38 generating a torque and a bracket 34 provided with the motor 38. The driver 30 may transfer the torque to the moving frame 24. The motor 38 is directly connected to the moving frame 2224. When the torque of the motor 38 is transferred to the moving frame 24, the moving frame 24 connected to the bracket 34 moves. The moving frame 24 may be provided with the bracket 34 so that the moving frame 24 may move along the fixed frame 22 by the torque of the motor 38.

The fixed bracket has one side connected to the fixed frame 22 and the other side connected to the moving frame 24. Both sides of the fixed bracket are provided with bent portions in a length direction of the fixed bracket to prevent the fixed bracket from separating from the fixed frame 22. The fixed bracket may be made of a material which does not generate friction heat between the fixed frames 22 when the moving frame 24 moves.

The motor 38 is connected to the moving frame 24 to directly transfer the torque generated from a rotor to the moving frame 24. Both sides of the motor 38 may be provided with rotating shafts so that the moving frame 24 moves in the same direction as the fixed frame 22. A first rotating shaft and a second rotating shaft of the motor 38 are each connected to the moving frame 24 and thus the moving frame 24 moves by the operation of the motor 38.

The bracket 34 is provided with a seating part in which the motor 38 is disposed and both sides thereof are connected to the moving frame 24. The bracket 34 may be provided with a fixed protrusion through which at least of the first rotating shaft and the second rotating shaft penetrates. The fixed protrusion may be formed in plural in a direction through which the rotating shaft penetrates, having different sizes. The fixed protrusion is formed to be larger than a circumference of the rotating shaft of the motor and thus is not affected upon the rotation of the rotating shaft of the motor 38. However, the separation of the motor 38 may not be prevented.

An operation of one embodiment of the balancing apparatus of a vehicle and the control method thereof according to the present invention configured as described above will be described.

FIGS. 5A and 5B are plan views of the balance control apparatus during operation according to the embodiment of the present invention, and FIG. 6 is a flow chart of an embodiment of a control method of the balancing apparatus of a vehicle according to the present invention.

Describing one embodiment of the balancing apparatus of a vehicle according to the embodiment of the present invention with reference to FIG. 6, the position of the battery pack supplying power to the vehicle is stored (S10). When receiving the power of the vehicle from the battery pack, the controller stores the position of the battery pack. Here, the position storage of the vehicle is made by loading specifications of the vehicle and loading information on weights for each part of the vehicle, etc. The controller calculates the axle weights depending on the loaded specifications of the vehicle and the loaded information on the parts of the vehicle. The controller calculates the weights for each system and the center of gravity of the vehicle. The controller calculates the position of the battery pack, thereby storing the position of the battery pack depending on the supply of power.

Next, the load is measured by the load sensors installed in the seats of the vehicle (S20). The seats of the vehicle are each provided with the load sensors. The plurality of seats are installed in the vehicle and the plurality of seats are each provided with the load sensors, such that the load values measured in the plurality of seats are transferred to the controller to be compared. The controller receives the values measured by the load sensors.

The controller calculates the center of gravity of the vehicle based on the values measured by the load sensor (S30). The controller senses whether the values measured by the load sensor are equal to or more than the preset value. If it is determined that the values measured by the load sensor are equal to or more than the preset value, the controller moves the battery pack depending on the center of gravity of the vehicle to control the center of gravity of the vehicle (S40). Here, the controller compares loads generated in the plurality of sheets. The controller transfers a signal to driver to move the battery pack in a direction in which the center of gravity is low. The driver is operated by receiving the signal from the controller to move the battery pack.

Here, referring to FIG. 5A, if the center of gravity is present at the left of the vehicle 1 at the position of the battery pack 10, the battery pack 10 moves to the right side so that the center of gravity of the vehicle 1 is generated at the center, thereby preventing the center of gravity from leaning to one side.

Similarly, referring to FIG. 5B, if the center of gravity is present at the right of the vehicle 1 at the position of the battery pack 10, the battery pack 10 moves to the left side so that the center of gravity of the vehicle 1 is generated at the center, thereby preventing the center of gravity from leaning to one side.

Next, the values measured by the load sensors are transferred to the controller to measure a change depending on the load application (S50) to move the battery pack. Therefore, the vehicle may be balanced by the movement of the battery pack.

Therefore, balancing apparatus of a vehicle may move the battery pack of the vehicle to maintain the balance of the vehicle to prevent the pull, the roll, etc., upon the left turn and the right turn while driving, thereby improving the driving stability and the brake stability, may actively control the high voltage battery of the hybrid electric vehicle to improve the convenience, and may be applied to the vehicle models to which the high voltage battery of the hybrid electric vehicle is applied to decrease costs due to the package layout.

FIG. 7 is a flow chart of another embodiment of a control method of the balancing apparatus according to the present invention.

Describing another embodiment of the balancing apparatus according to the present invention with reference to FIG. 7, the position of the battery pack supplying power to the vehicle is stored (S10). When receiving the power of the vehicle from the battery pack, the controller stores the position of the battery pack. In this case, the information on vehicle specifications, the weights for each load and part, etc., is loaded to calculate the axle weights for each part and the weights for each system and the center of gravity of the vehicle to calculate the position of the battery pack, thereby storing the position of the battery pack depending on the supply of power.

Next, the load is measured by the load sensors installed in the seats of the vehicle (S20). The seats of the vehicle are each provided with the load sensors. The plurality of seats are installed in the vehicle and the plurality of seats are each provided with the load sensors, such that the load values measured in the plurality of seats are transferred to the controller to be compared. The controller receives the values measured by the load sensors.

The controller calculates the center of gravity of the vehicle based on the values measured by the load sensor (S30). The controller senses whether the values measured by the load sensor are equal to or more than the preset value. If it is determined that the values measured by the load sensor are equal to or more than the preset value, the controller moves the battery pack depending on the center of gravity of the vehicle to control the center of gravity of the vehicle (S40). Here, the controller compares loads generated in the plurality of sheets. The controller transfers the measured values to driver to move the battery pack in a direction in which the center of gravity is low. The driver is operated by receiving the measured values from the controller to move the battery pack.

Here, in the controlling of the balance of the vehicle, if the vehicle speed is sensed, the load change of the vehicle is measured (S45). If the speed is not generated in the vehicle, the position movement of the battery pack for the balance of the vehicle may not be made. In this case, if the speed is again generated in the vehicle, the values measured by the load sensors are transferred to the controller to measure the change depending on the load application (S50) to move the battery pack.

Therefore, the balancing apparatus of a vehicle may move the battery pack of the vehicle to maintain the balance of the vehicle to prevent the pull, the roll, etc., upon the left turn and the right turn while driving, thereby improving the driving stability and the brake stability, may actively control the high voltage battery of the hybrid electric vehicle to improve the convenience, and may be applied to the vehicle models to which the high voltage battery of the hybrid electric vehicle is applied to decrease costs due to the package layout.

The left and right axle weights maintain the balance by the high voltage battery of the hybrid electric vehicle to prevent the pull, the roll, etc., of the vehicle, the left and right axle weights maintain the balance by the high voltage battery of the hybrid electric vehicle to improve the driving stability which is problematic when the tire, a tire air pressure, alignment, etc., are applied, improve the brake stability even upon the left turn and the right turn while driving, and the margin of the package layout is secured at the time of the development of the vehicle module to save costs.

The balancing apparatus of a vehicle and the control method thereof according to the exemplary embodiment of the present invention have at least one of the following effects.

First, according to the balancing apparatus of a vehicle and the control method thereof according to the exemplary embodiment of the present invention, the left and right axle weights may be balanced by the high voltage battery of the hybrid electric vehicle to prevent the pull, the roll, etc., upon the left turn and the right turn while driving, thereby improving the driving stability and the brake stability.

Second, according to the balancing apparatus of a vehicle and the control method thereof according to the exemplary embodiment of the present invention, the driving stability and convenience may be improved by actively controlling the high voltage battery of the hybrid electric vehicle.

Third, according to the exemplary embodiment of the present invention, the balancing apparatus of a vehicle and the control method thereof may be applied to the vehicle models to which the high voltage battery of the hybrid electric vehicle is applied to save costs due to the package layout.

The balancing apparatus of a vehicle and the control method thereof according to the embodiment may not restrictively apply the configuration and the method of the above-mentioned embodiments. That is, all or some of the respective exemplary embodiments may be selectively combined with each other so that they may be various modified.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present invention claimed in the following claims."

What is claimed is:

1. A balancing apparatus of a vehicle, comprising:
a load sensor configured to be installed in a seat of the vehicle to measure a weight of a passenger sitting on the seat;
a battery pack configured to supply power to the vehicle;
a plurality of moving frames configured to be fixed with the battery pack;
a plurality of fixed frames configured to be fixed to the vehicle; and
a driver configured to move the moving frames relative to the fixed frames, the driver including a motor configured to generate a torque,
wherein each of the plurality of moving frames is movably installed on each of the plurality of fixed frames, respectively,
wherein the motor is disposed between the plurality of moving frames, and
wherein the motor has both sides provided with rotating shafts to move the moving frames in a same direction, and the rotating shafts are each connected to the moving frames.

2. The balancing apparatus of a vehicle according to claim 1, wherein the driver further includes:
a bracket configured to be provided with the motor,
wherein the bracket is installed on the plurality of moving frames.

3. The balancing apparatus of a vehicle according to claim 2, wherein the motor is directly connected to the plurality of moving frames to deliver the torque generated from a rotor to the moving frame.

4. The balancing apparatus of a vehicle according to claim 2, wherein the bracket is provided with a seating part in which the motor is disposed and is provided with a fixed protrusion through which the rotating shaft penetrates.

5. The balancing apparatus of a vehicle according to claim 4, wherein the fixed protrusion comprises a plurality of fixed protrusions of different sizes.

6. A control method of a balancing apparatus of a vehicle, comprising the steps of:
storing a position of a battery pack supplying power to the vehicle;
measuring a load by a load sensor installed in a seat of the vehicle;
calculating a center of gravity of the vehicle based on a value measured by the load sensor; and
controlling the center of gravity of the vehicle by moving the battery pack depending on the calculated center of gravity of the vehicle on a plurality of moving frames and a plurality of fixed frames,
wherein the plurality of moving frames is configured to be fixed with the battery pack,
wherein the plurality of fixed frames is configured to be fixed to the vehicle,
wherein each of the plurality of moving frames is movably installed on each of the plurality of fixed frames, respectively,
wherein a motor is disposed between the plurality of moving frames, and
wherein the motor has both sides provided with rotating shafts to move the moving frames in a same direction, and the rotating shafts are each connected to the moving frames.

7. The control method according to claim 6, wherein in the step of measuring the load by the load sensor, the vehicle is provided with a plurality of seats and the plurality of seats are provided with load sensors to compare load values measured in the plurality of seats, respectively.

8. The control method according to claim 7, wherein it is determined whether the values measured by the load sensors are equal to or more than a preset value.

9. The control method according to claim 7, wherein the battery pack moves in a direction in which the center of gravity is low by comparing the values measured by the load sensors.

10. The control method according to claim 6, wherein the controlling of the center of gravity of the vehicle includes measuring a load change of the vehicle when a vehicle speed is sensed.

* * * * *